Patented Sept. 2, 1952

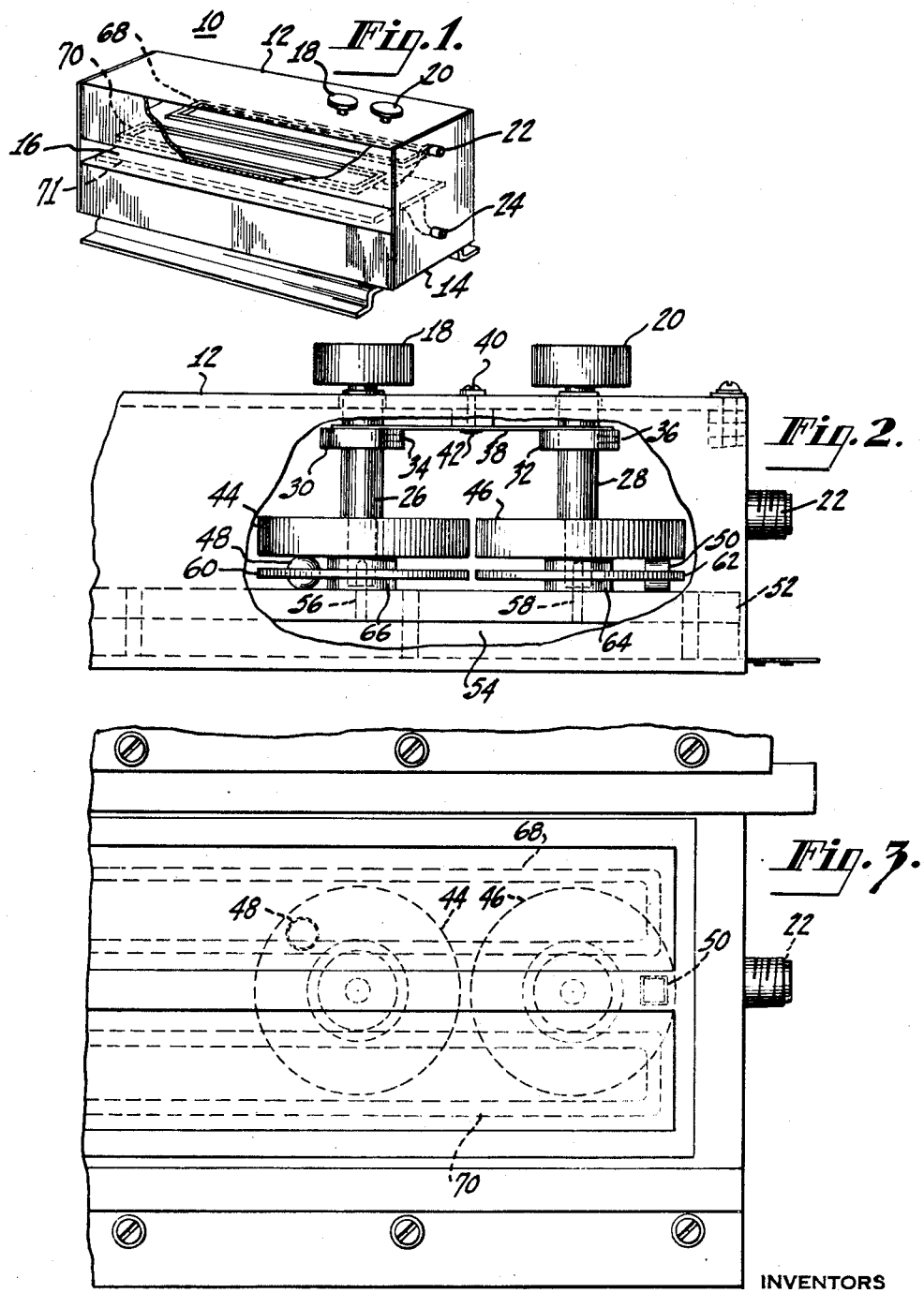

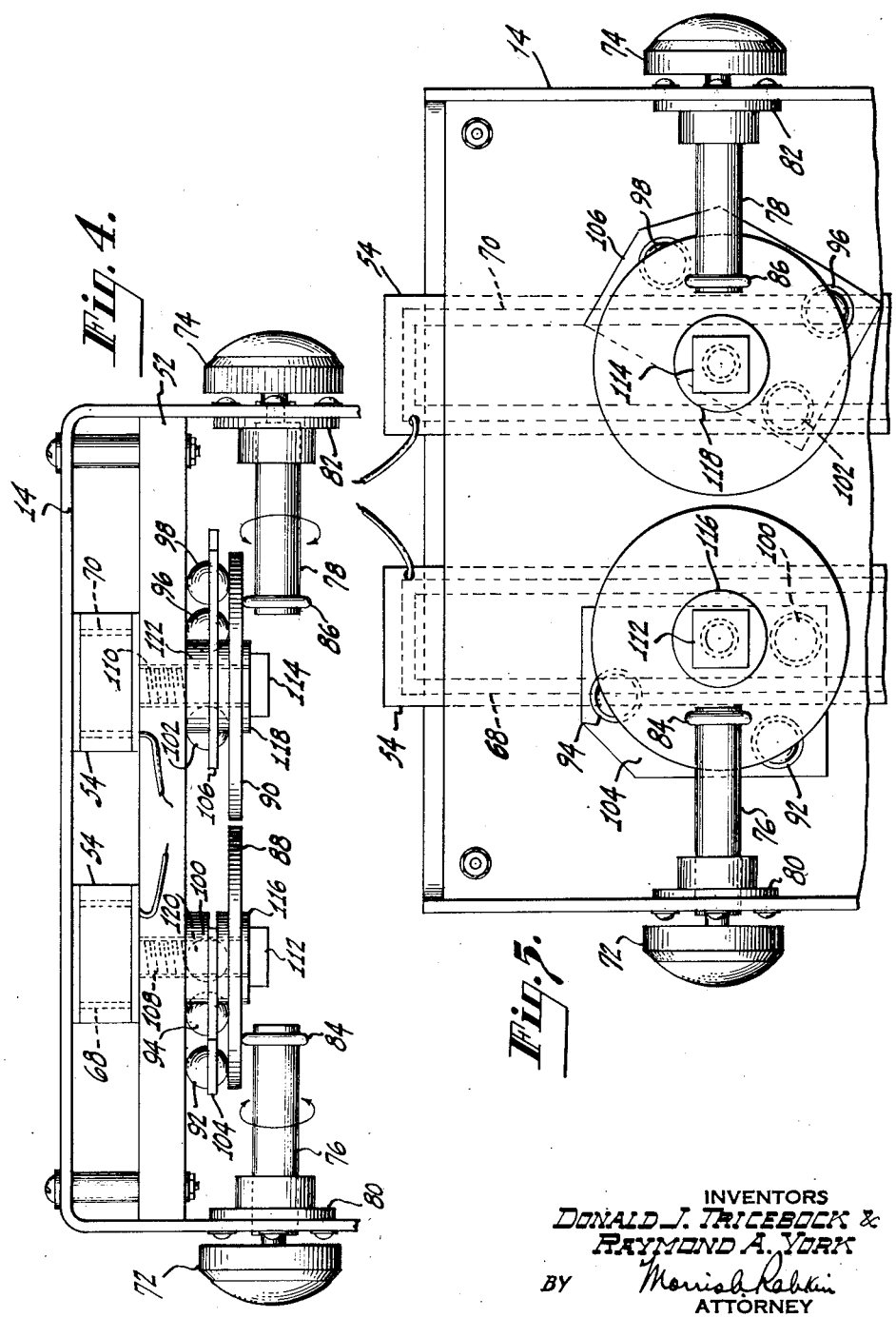

2,609,530

UNITED STATES PATENT OFFICE 2,609,530

BALANCE CONTROLS FOR METAL DETECTORS

Donald J. Tricebock, Philadelphia, Pa., and Raymond A. York, Syracuse, N. Y., assignors to Radio Corporation of America, a corporation of Delaware Application May 5, 1949, Serial No. 91,609

8 Claims. (Cl. 336—79)

The present invention relates to inspection apparatus, and more particularly is an improvement in metal detecting apparatus.

A metal detector or inspection machine of the general type contemplated has been described and claimed in a copending application, Serial No. 568,045, filed December 13, 1944, by J. H. Reynolds for Metal Detectors, now Patent No. 2,513,745, dated July 4, 1950, which is assigned to the same assignee as the present invention. The general principle of operation of devices of this type, insofar as the present invention is concerned, involves the establishment of induced alternating voltages which are normally of equal amplitude and opposite phase. This may be accomplished, for example, by applying alternating currents to a primary coil to establish a magnetic field and positioning two secondary coils in the field, the secondary coils being connected in opposition and so spaced that the induced voltages are normally equal and opposite. Alternatively, two magnetic fields may be established by a pair of primary coils in symmetrical coupling relation to a single secondary or to two secondary windings connected in opposition. The initial operating condition is normally a null balance.

In order to indicate or detect a metal particle, the material being tested is passed between the primary and secondary coils by any convenient means, such as a fabric conveyor belt. It is well known that the magnetic field around a coil extends a considerable distance and that any conductor or magnetic material brought into this field will distort it. Distortion may be due to the magnetic permeability of the metal or due to the magnetic field produced by currents induced in the object if it is conductive. Consequently, the initial balance, which is very critical, will be upset by any object having electrical properties of permeability or conductivity which is placed in the field of the device, even at a considerable distance from the device.

The sensitivity of a metal detector to small disturbances of the magnetic field depends primarily upon the perfection of the initial balance, and the maintenance of high sensitivity under conditions of vibration and changes in temperature normally encountered requires a high degree of stability. Theoretically, a perfect balance can be obtained by a careful orientation of identical coils. However, it is necessary as a practical matter to place the coils in shielding containers to limit the coupling field to the space immediately between the coils so as to prevent adjacent objects and operating personnel from upsetting the critical balance. It has been found that it is impractical to construct shields and coils with sufficiently accurate tolerances to provide a null of the order required for sensitive operation. Consequently, either one or both of these sources of non-uniformity tend to introduce into the secondary a residual voltage which cannot be balanced out by merely shifting the position of the coils. This residual voltage may be the resultant of a number of complex voltages of random phase angle.

Copending application Serial No. 6,047, filed February 3, 1948, by Ben R. Gossick discloses how a balance for the metal detecting apparatus may be obtained by placing metal slugs of dissimilar metals into the coupling field. These slugs react with the field to produce two voltages in quadrature in the detecting coil of the metal detector. By varying the amplitude of each of these quadrature voltages, the voltages induced in the detecting coil as a result of dissymmetries of the metal detecting system may be balanced out and a complete null obtained.

In order that the principles disclosed in the above noted application of Gossick be utilized for balancing a metal detector field, it is necessary that each metal slug move over such a path that the quadrature voltages induced in the detecting coil, due to the presence of the metal, should vary from a positive maximum through zero to a negative maximum (for a given metal, at a given frequency, in a given field, there is no change in phase angle). The mechanical arrangement for this presents several difficulties. The metal slugs must be formed so that there is no change in their impedance as they are moved about in the metal field. Facile, yet extremely precise and rigid, adjustment is required because, if a metal slug is of a size to appreciably affect the balance of voltages induced from the metal detector field, slight movements will appreciably unbalance these voltages. All moving parts associated with the metal slugs must be non-metallic.

It is therefore an object of our invention to provide an improved balancing system for the voltages induced in a metal detector field.

It is a further object of our invention to provide an improved balancing system for the voltages induced in a metal detector field which is readily adjustable yet mechanically rigid.

It is also a further object of our invention to provide an improved balancing system for the voltages induced in a metal detector field which is continuously variable.

It is a still a further object of our invention to provide, in metal detector apparatus employing metal slugs, an improved balancing system for the voltages induced in a metal detector field wherein the voltage balance is affected only by the metal slugs in said system.

These and other objects are achieved in accordance with our invention by moving metal spheres or cylinders through the fields of the coils which radiate said field in a plane at right angles to the axis of said field and utilizing dielectric material for positioning and controlling the movement of the metal elements through said field. By the axis of the field is meant the line passing through the center of the coupling field and substantially at right angles to the planes of the oscillator and detector coils.

The novel features of our invention, both as to its organization and method of operation, as well as additional objects and advantages thereof, will best be understood from the following description of several illustrative embodiments thereof, when read in connection with the accompanying drawings in which similarly identified parts have similar functions and wherein:

Figure 1 shows, in perspective, a metal detector head having the balancing controls of the instant invention, Figure 2 is a side elevation of the portion of the upper housing shield of the metal detector head containing the balancing control, with a section of the shield cut away for the better illustration thereof, Figure 3 is a bottom plan view of the portion of the housing shield shown in Figure 2, Figure 4 is a side elevation of another embodiment of the invention used in a lower housing shield of a metal detector head, and Figure 5 is a bottom plan view of Figure 4.

In Figure 1 is shown a typical metal detector head 10 having an upper housing shield 12 and a lower housing shield 14. These two housing shields are spaced apart by end supports to provide an aperture 16 therebetween through which passes a conveyor belt (not shown) carrying the articles in which metal particles sought to be detected are located. The upper housing shield 12 contains two field coils 68, 70 (shown in dotted lines) which are disposed side by side and longitudinally along the bottom of the upper housing shield 12. These are the coils which are excited to set up the metal detecting field so that the axis of the field is perpendicular to the plane of the aperture 16 in a manner that is well known in the art. The lower housing shield 14 contains the detector coil 71 (shown in dotted lines) which is disposed longitudinally along the upper portion of the lower housing shield 14. Suitable openings are provided in the upper and lower housing shields 12, 14 to permit the detector field to be established across the aperture 16.

Two control knobs 18, 20, in accordance with the present invention, are shown at the top of the upper housing shield 12. The threaded plugs 22, 24 shown protruding from the upper housing shield 12 and the lower housing shield 14 are respectively for the purpose of coupling power to the field coils and for coupling the detected signal from the detector coil to an indicator.

Referring, now, to Figure 2, it is shown therein that the two control knobs 18, 20 are respectively connected to two shafts 26, 28. These shafts 26, 28 extend through the housing 12 and have pressure collars 30, 32 fitted thereon. By means of two set screws 34, 36 the pressure collars 30, 32 are respectively fastened to the two shafts 26, 28. A spring 38 is fastened at its center by a screw 40 and a nut 42 to the housing shield 12. The spring 38 presses against the pressure collars 30, 32 to urge them and the shafts 26, 28 to which they are fastened downwardly. By loosening the set screws 34, 36, the collars 30, 32 may be moved upward or downward to obtain a desired pressure and then the set screws 34, 36 are tightened again. Two pressure plates 44, 46 are respectively tightly fitted on the shafts 26, 28. A metal sphere 48 and a metal cylinder 50 are each respectively held pressed against a coil support plate 52 which carries a coil cover 54 in which the field coils 68 and 70 are housed. The support plate 52 holds the coils 68 and 70 flat and rigid against the bottom of the upper shield housing 12. The cylinder 50 is so positioned that its longitudinal or cylindrical axis is maintained parallel to the plane of the coplanar coils.

The two shafts 26, 28 are counterbored to fit respectively over two bearing pins 56, 58 so that they can be rotated and yet will not move laterally. The bearing pins 56, 58 are tightly driven into the coil support plate 52. The metal sphere 48 and the metal cylinder 50 are each respectively positioned by retainer plates 60, 62. The retainer plates 60, 62 have orifices which are large enough respectively to hold the metal sphere 48 and cylinder 50 and yet permit them to be rotated and thereby to revolve around the axis of their respectively associated shafts 26, 28. The radial distance of each of the orifices from the centers of the respective retainer plates is equal to substantially one-half the distance between the centers of the coplanar field coils. The retainer plates 60, 62 are fastened respectively to two bearing collars 66, 64. These bearing collars 66, 64 are respectively fitted over the shafts 26, 28 so that each of the shafts 26, 28 and each of the bearing collars 66, 64 may rotate on their respective, common axes independently.

By turning either of the controls 18, 20, the pressure by the respective pressure plates 44, 46 on the sphere 48 and the cylinder 50 causes the sphere 48 or the cylinder 50 to be rotated and thereby to revolve around its associated shaft axis. The path traveled by either the sphere 48 or cylinder 50, it will be readily seen, is a circular one and is in a plane perpendicular to the field axis. All the parts of these controls except the spring 38, the sphere 48 and the cylinder 50 are made of a dielectric material such as "Bakelite" or "Lucite." The sphere form and the cylinder form of the metal slugs are merely by way of illustration of types or forms of metal slugs which have an unchanging impedance as they are rotated in the coil field. They may be used interchangeably. The metal of which either the sphere 48 or the cylinder 50 is made is preferably selected in accordance with the teachings of Ben R. Gossick in his above-identified, copending application for "Balance Control for Metal Detection and Inspection Equipment." Accordingly, the metal of the sphere 48 and the cylinder 50 is selected to induce, in the detector coil, voltages which have a quadrature phase relation. Some examples of metal which may be selected are given in Table III in the above identified application of Ben R. Gossick for "Balance Control for Metal Detection and Inspection Equipment." Some of these are magnetic stainless steel and non-magnetic stainless steel at a frequency of 15.0 kc., Nichrome and copper at 25.0 kc. or Nichrome and powdered iron at 40.0 kc.

From Figure 3, one may see the path along which the metal sphere 48 and the metal cylinder 50 are guided with reference to the field coils and therefore the path they take through the field set up by the field coils. In accordance with established metal detector practice, the field coils 68, 70 (shown dotted) are wound and excited to set up an opposing field with each other.

The metal slugs are located at such a radial distance from their respective shafts 26 and 28 that, as they are moved through a circular path, they will pass through the center of the field coil 68 where the field produced is a maximum in one direction and where maximum quadrature voltages are induced in one phase. The slugs next pass toward a position between the coils where the resultant field becomes a minimum in view of the opposing action of the coil fields. The quadrature voltages are thus gradually reduced to a minimum. The slugs next reach the center of the field coil 70 where the field it produces is a maximum in the opposite direction. The quadrature voltages induced at that position are a maximum with the opposite phase. Although the movement of the sphere 48 and the cylinder 50 along their respective orbits has been described herein as joint, it is to be understood that they are both independently adjustable.

Figures 4 and 5 show another embodiment of our invention wherein the bottom housing shield 14 contains the field coils 68, 70. Two control knobs 72, 74 are respectively mounted on two shafts 76, 78, which are supported by and rotate in bushings 80, 82. The bushings 80, 82 are fastened to the wall of the housing shield in well known fashion. Rings 84, 86 of rubber or other suitable friction drive materials are respectively tightly fitted over the ends of the shafts 76, 78 and respectively engage two pressure plates 88, 90, constituting friction drives therefor. On the other sides of each of the pressure plates 88, 90 are three spheres which are all of the same diameter. The spheres 92, 94, 96, 98 are made of glass or "Lucite" and each of the remaining spheres 100, 102 is made of a metal which will cause to be induced in the detector coil voltages which are in quadrature with each other in accordance with the teachings of the above-identified copending application of Ben R. Gossick. Three spheres are associated with each pressure plate 88, 90 and they are properly spaced in order that the pressure plates may remain level under the pressure of the friction drive. Each of the three spheres 92, 94, 100 and 96, 98, 102 is pressed tightly upwardly gainst the coil support plate 52. Two retainer plates 104, 106 hold the spheres in position so that they are free to be rotated and thereby to revolve around the axes of the respective shafts 108, 110. The orifices in the retainer plates 104, 106 in which the metal spheres 100, 102 are respectively retained are at a distance from the center of said plates which is equal to the narrowest diameter of the field coils. The shafts 108, 110 have enlarged square endings 112, 114 which support the collars 116, 118. The other ends of the shafts 108, 110 are tightly fitted or threaded into suitable openings in the coil support plate 52. The pressure plates 88, 90 are respectively fitted on the collars 116, 118 which are respectively rotatably fitted on shafts 108, 110. The two retainer plates 104, 106 are also respectively fitted on collars 120, 122 which are fitted on the shafts 108, 110 in a manner to be rotatable.

Figure 5 shows the position of the metal spheres 100, 102 relative to the coils 68, 70. From Figure 5, it can be seen that, as the control knobs are rotated, the metal spheres 100, 102 will each be moved from one side of their respectively associated coils 68, 70 to the other, and thus moved from a minimum field to a maximum field and back to a minimum field. The induced quadrature voltages will similarly vary from a minimum to a maximum to a minimum again. All the parts used for the controls herein described are also made of "Bakelite" or other suitable dielectric material with the exception of the metal slugs the composition of which is selected in accordance with the teachings of the application of Ben R. Gossick previously cited herein.

We have shown herein two embodiments of our invention which enable a fine balance to be obtained for the voltages induced in a metal detector field. The apparatus shown is rigid and not subject to motion due to the vibration which apparatus in proximity with conveyor belts usually receives. Although the embodiments of our invention are shown in connection with a metal detector field, this should not be construed in a limiting sense, since the principles herein shown are applicable to any apparatus wherein magnetically coupled circuits are arranged in order to have a balanced energy transfer to another circuit. It will be apparent to one skilled in the art that various alterations and modifications may be made of the forms of the invention described herein without departing from the spirit and scope hereof.

What is claimed is:

1. In apparatus employing a pair of field coils for establishing an electromagnetic field and an associated detector coil wherein voltages induced by said field are to be balanced, apparatus for effecting a substantial balance of said voltages which comprises first and second metal means to induce phase quadrature voltages in said detector coil, said metal means being mounted for movement through said field and being shaped to have a constant impedance during movement through said field in a plane substantially at right angles to the axis of said field, and means to move said first and second metal means independently in said plane between the centers of said field coils whereby the amplitudes of said phase quadrature voltages are varied.

2. The apparatus recited in claim 1 wherein said means to move said first and second metal means independently through said magnetic field is made of a dielectric material.

3. In apparatus employing a pair of field coils for establishing an electromagnetic field and an associated detector coil wherein voltages induced by said field are to be balanced, apparatus for effecting a substantial balance of said voltages which comprises first and second metal means to induce phase quadrature voltages in said detector coil, said metal means being shaped to have a constant impedance with rotation in said field and throughout a plane substantially at right angles to the axis of said field, means to move said first metal means in said plane from one side to the other of one of said field coils, and means to move said second metal means from one side to the other of the other of said field coils whereby the amplitudes of said phase quadrature voltages are varied.

4. The apparatus recited in claim 3 wherein said metal means are spherical.

5. The apparatus recited in claim 3 wherein said metal means are cylindrical and the axis of said cylinder is parallel to said plane.

6. The combination with a metal detector head having at least two coplanar field coils positioned by a coil support plate and a detector coil in spaced, cooperative relation with said field coils of apparatus for substantially cancelling the effects of any metal detector field dissymmetry, said apparatus comprising first and second metal means for inducing phase quadrature voltages in said detector coil, said metal means being shaped to have a constant impedance upon rotation in said field and throughout a plane at right angles to the axis of said field, a pair of pressure plates respectively holding said first and second metal means against said coil support plate, a pair of shafts respectively connected to and extending through the centers of each of said pressure plates, said shafts being normal to said coplanar field coils and being rotatably supported in a plane passing between and at right angles to said coplanar field coils, said shafts also being spaced longitudinally along said field coils, means yieldingly urging said shafts toward said pressure plates whereby said pressure plates press said first and second metal means against said coil support plate, and a pair of retainer plates respectively positioned between each of said pressure plates and said coil support plate and rotatably mounted on said shafts each for rotation in a plane parallel to said coplanar field coils, said retainer plates having apertures therein to respectively retain said first and second metal means while permitting them to rotate, and said apertures being spaced from the centers of said retainer plates a distance equal substantially to one-half the distance between said coplanar field coil centers, the rotation of said shafts causing said first and second metal means to move each in a plane parallel with the plane of said coplanar field coils and substantially between said field coil centers.

7. The combination with a metal detector head having at least two coplanar field coils positioned by a coil support plate and a detector coil in spaced cooperative relation with said field coil, of apparatus for substantially cancelling the effects of the metal detector field dissymmetry, said apparatus comprising first and second spherical metal means for inducing phase quadrature voltages in said detector coil, two pairs of dielectric spheres respectively associated with and having the same diameter as said first and second spherical metal means, a pair of shafts supported by said coil support plate and being respectively positioned on said coil plate on the line bisecting each field coil, a pair of pressure plates for respectively holding said first and second spherical metal means and said associated pairs of spheres against said coil support plate, said pressure plates being rotatably mounted on said respective shafts, a pair of retainer plates respectively positioned between said respective pressure plates and said coil support plates and rotatably mounted on said respective shafts, said retainer plates having apertures to respectively retain said first and second spherical metal means and said respective pairs of dielectric spheres while permitting them to rotate, said apertures for said first and second spherical metal means being spaced from the center of said retainer plates a distance equal to one-half the narrowest diameter of the respective field coils, said pairs of spheres being retained in the apertures in said respective retainer plates at positions to maintain said pressure plates substantially parallel to said coil support plate, and a pair of friction drives respectively pressing said respective pressure plates against said first and second spherical metal means and their associated dielectric spheres, the actuation of said respective friction drives causing said first and second spherical metal means to move in a plane substantially parallel with the plane of said coplanar field coils and from one side to the other of the respective field coils.

8. The combination with a metal detector head having at least two coplanar field coils positioned by a coil support plate and a detector coil in spaced cooperative relation with said field coil, of apparatus for substantially cancelling the effects of the metal detector field dissymmetry, said apparatus comprising first and second cylindrical metal means for inducing phase quadrature voltages in said detector coil, two pairs of dielectric cylinders respectively associated with and having the same diameter as said first and second cylindrical metal means, a pair of shafts supported by said coil support plate and being respectively positioned on said coil plate on the line bisecting each field coil, a pair of pressure plates for respectively holding said first and second cylindrical metal means and said associated pairs of cylinders against and with their cylindrical axes parallel to said coil support plate, said pressure plates being rotatably mounted on said respective shafts, a pair of retainer plates respectively positioned between said respective pressure plates and said coil support plates and rotatably mounted on said respective shafts, said retainer plates having apertures to respectively retain said first and second cylindrical metal means and said respective pairs of dielectric cylinders while permitting them to rotate, said apertures for said first and second cylindrical metal means being spaced from the center of said retainer plates a distance equal to one-half the narrowest diameter of the respective field coils, said pairs of cylinders being retained in the apertures in said respective retainer plates at positions to maintain said pressure plates substantially parallel to said coil support plate, and a pair of friction drives respectively pressing said respective pressure plates against said first and second cylindrical metal means and their associated dielectric cylinders, the actuation of said respective friction drives causing said first and second cylindrical metal means to move in a plane substantially parallel with the plane of said coplanar field coils and from one side to the other of the respective field coils.

DONALD J. TRICEBOCK.
RAYMOND A. YORK.

REFERENCES CITED

The following references are of record in the file of this patent:

UNITED STATES PATENTS

| Number | Name | Date |
| --- | --- | --- |
| 1,940,769 | Potter | Dec. 26, 1933 |
| 1,954,470 | Carlson | Apr. 10, 1934 |
| 1,969,819 | Rinia | Aug. 14, 1934 |
| 2,145,742 | Wechsung | Jan. 31, 1939 |
| 2,237,254 | Broekhuysen | Apr. 1, 1941 |
| 2,321,356 | Berman | June 8, 1943 |
| 2,513,745 | Reynolds | July 4, 1950 |